April 19, 1938.  W. H. BASELT  2,114,953
CLASP BRAKE
Filed Dec. 4, 1936  2 Sheets-Sheet 1
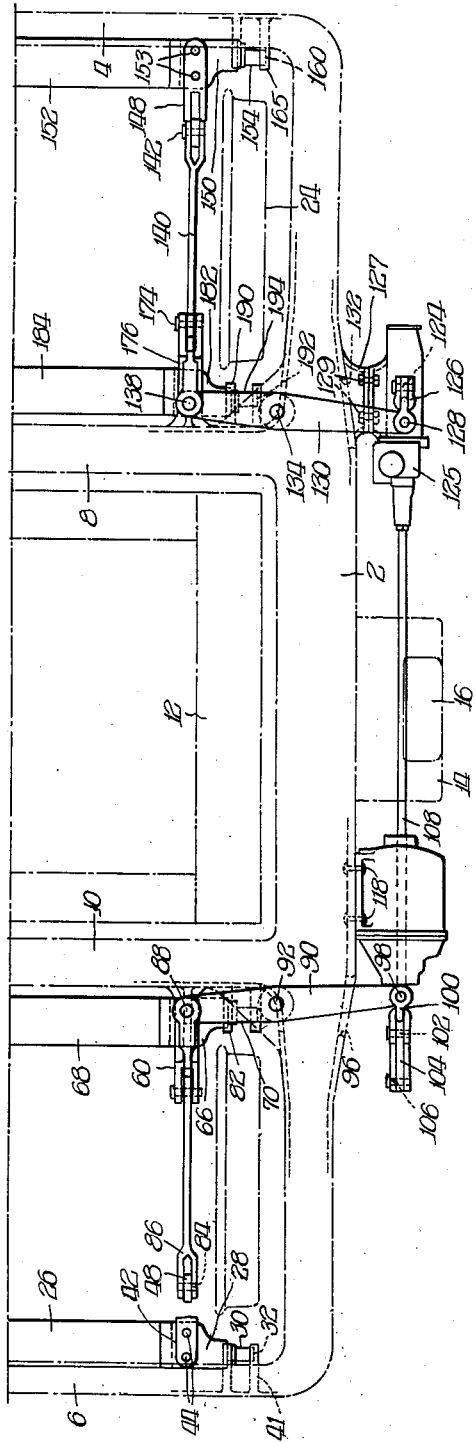
Inventor:
Walter H. Baselt,
By Orin O. Garner
atty

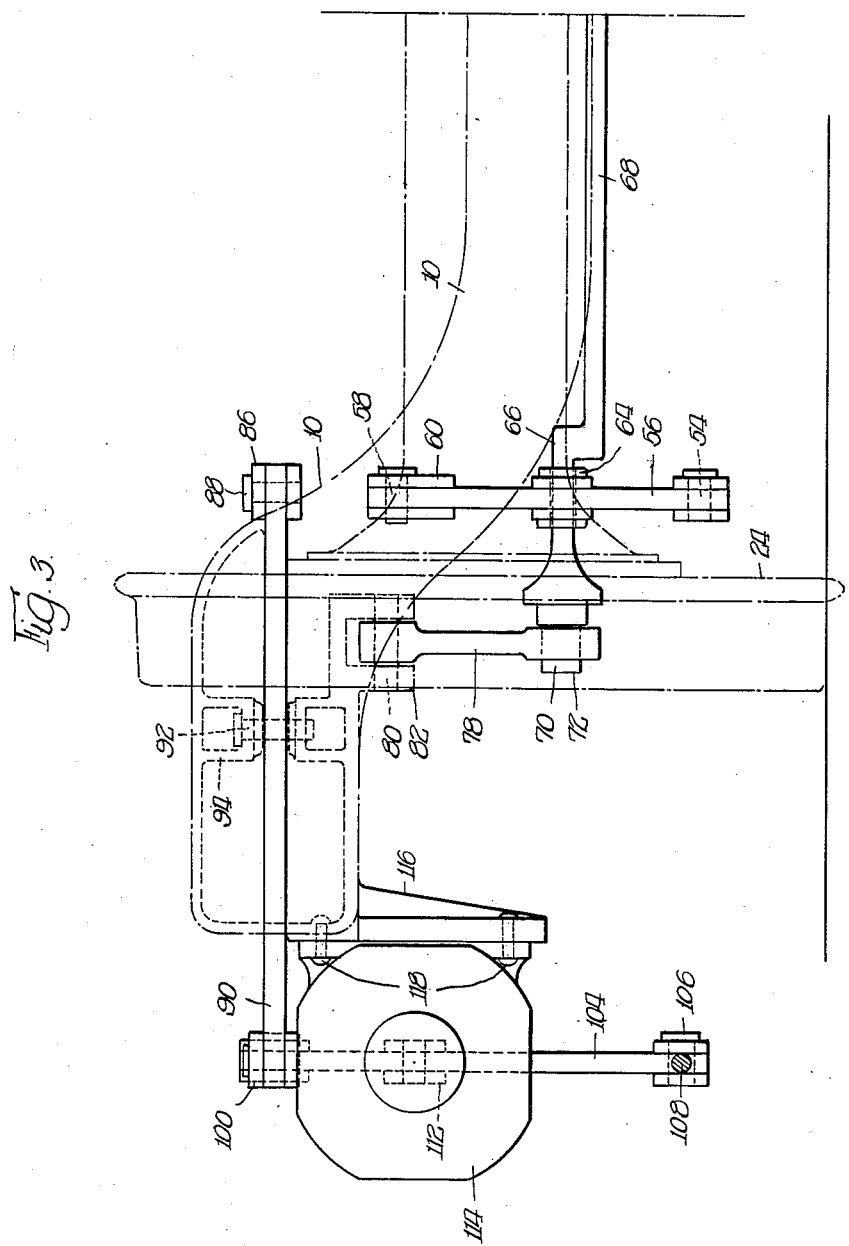

Patented Apr. 19, 1938

2,114,953

UNITED STATES PATENT OFFICE 2,114,953

CLASP BRAKE

Walter H. Baselt, Chicago, Ill., assignor to American Steel Foundries, Chicago, Ill., a corporation of New Jersey Application December 4, 1936, Serial No. 114,177

36 Claims. (Cl. 188—56)

My invention relates to brake rigging for a railway car truck and more particularly to a so-called clasp brake design wherein brake heads and brake shoes are applied at the opposite sides of each wheel.

An object of my invention is to provide a simple and yet compact arrangement for a car truck having an exceptionally long wheel base.

Yet another object is to provide a clasp brake rigging for a railway car truck having a load carrying member with side bearings outwardly of the side frames thus providing increased stability for such a truck for use in high-speed trains.

A still further object is to provide a brake rigging for a railway car truck having the above-mentioned features while at the same time mounting the power means upon the truck frame.

A yet further object of my invention is to provide brake rigging in a railway car truck in such form as to allow maximum clearance for the car body in order to secure the lowest possible center of gravity in a high-speed train.

Still another object of my invention is to provide brake rigging for a truck in a high-speed train with operative equipment mounted on said truck and said rigging including transverse levers, none of said transversely arranged levers extending above the upper level of the car truck.

With these and various other objects in view, my invention may consist of certain novel features of construction and operation as will be more fully described and particularly pointed out in the specification, drawings and claims appended hereto.

In the drawings which illustrate embodiments of the device and wherein like reference characters are used to designate like parts—

Figure 1 is a top plan view of a car truck embodying my invention, only one-half of the truck and brake structure being shown inasmuch as the arrangement is the same on opposite sides of the truck;

Figure 2 is a side elevation of the truck and brake rigging shown in Figure 1; and Figure 3 is a sectional view of the truck and brake structure shown in Figures 1 and 2, the section being taken substantially in the vertical plane bisecting the truck transversely and looking to the left.

In each of the views, certain details shown in other views are omitted for the sake of clarity and simplicity.

Describing the structure in more detail, the truck frame comprises a side member 2, integrally formed end rails 4 and 6 and spaced transoms 8 and 10 between which may be supported the span bolster 12 upon which may be carried the center bolster or load carrying member having the end 14 upon which is mounted the side bearing 16, said end projecting outwardly of the side frame 2 to provide a side support for the car body outwardly of said side frame. Adjacent each end, each side frame is provided with the column guides 18 and 20 forming therebetween the window opening 22 which provides a means of cooperation with the journal portion (not shown) of the wheel and axle assembly 24.

The brake rigging comprises the brake beam 26 (Figure 1, left) having the offset end 28 with the trunnion portion 30 upon which as at the pivotal point 32 may be mounted the brake head 34 with its associated brake shoe 36. At the said pivotal point 32 is likewise secured the lower end of the hanger 38, the upper end of said hanger being pivotally secured as at 40 to the bracket 41 integrally formed with the truck frame adjacent the juncture of the end rail 6 with the side frame 2. On the offset end 28 of the brake beam 26 is secured the fulcrum 42 as by means of rivets 44—44, the outer end of said fulcrum having a pivotal connection as at 46 to a point intermediate the ends of the live truck lever 48, the lower end of said live truck lever having a pivotal and adjustable connection as at 50 to the pull rod 52, the opposite end of said pull rod having a pivotal and adjustable connection as at 54 to the lower end of the dead truck lever 56, the upper end of said dead truck lever 56 being pivotally secured as at 58 to the bracket 60 integrally formed with the transom 10. At a point intermediate the ends of the dead truck lever 56 as at 62 is pivotally connected the fulcrum 64 which is secured on the offset end 66 of the brake beam 68 in the manner previously described for the fulcrum 42 mounted on the brake beam 26. On the trunnion end 70 of the beam 68 is pivotally mounted as at 72 the brake head 74 with its associated brake shoe 76 and, likewise, at the pivotal point 72, is connected the lower end of the hanger 78 providing support for the rigging intermediate the wheels at this end of the truck, the upper end of said hanger being pivotally connected as at 80 to the bracket 82 integrally formed with the transom 10.

The upper end of the live truck lever 48 is pivotally connected as at 84 to the pull rod 86, the opposite end of said pull rod having a pivotal connection as at 88 to the dead horizontal lever 90, said dead horizontal lever extending through the opening 96 formed in the side frame 2 and being fulcrumed intermediate its ends as at 92 from the bracket 94 integrally formed on the truck frame at the juncture of the transom 10 with the side frame 2. The outer end of the horizontal lever 90 is pivotally connected as at 98 to the clevis means 100, the opposite end of said clevis means being pivotally connected as at 102 to the upper end of the cylinder lever 104, the lower end of said cylinder lever having a pivotal connection as at 106 to the pull rod 108. Intermediate its ends, the cylinder lever 104 is pivotally connected as at 110 to the piston 112 of the power means 114, said power means being secured to the bracket 116 (Figure 3) as by means of rivets 118, said bracket being integrally formed on the side frame 2.

The pull rod 108 extends below the projecting end 14 of the load carrying member or center bolster and at its opposite end is pivotally connected as at 120 to the lower end of the slack adjuster lever 122, said slack adjuster lever 122 being pivotally and adjustably connected at a point intermediate its ends as at 123 to the automatic slack adjuster 125 secured to the bracket 127 integrally formed with the side frame 2 as by the rivet means 129. The upper end of said slack adjuster lever 122 has a pivotal connection as at 124 to the clevis means 126, the opposite end of said clevis means having a pivotal connection as at 128 to the dead horizontal lever 130, said horizontal lever 130 extending through the opening 132 provided in the side frame 2. At a point intermediate its ends, the horizontal lever 130 is fulcrumed in said opening as at 134 to the bracket 136 integrally formed on the truck frame at the juncture of the side frame 2 and the transom 8. The inner end of the horizontal lever 130 is pivotally connected as at 138 to the pull rod 140 and the opposite end of said pull rod is pivotally connected as at 142 to the upper end of the live truck lever 144. At a point intermediate its ends as at 146, the live truck lever 144 is pivotally connected to the fulcrum 148 which is secured on the offset end 150 of the brake beam 152 as by means of rivets 153. On the trunnion end 154 of the brake beam 152 is pivotally secured the brake head 156 with its associated brake shoe 158 and, at the same pivotal point, as at 160 is secured the lower end of the supporting hanger 162, the upper end of said hanger being pivotally connected as at 164 from the bracket 165 integrally formed with the truck frame adjacent the juncture of the end rail 4 with the side frame 2.

The lower end of the live truck lever 144 is pivotally and adjustably connected as at 166 to the pull rod 168, the opposite end of said pull rod being pivotally and adjustably connected as at 170 to the lower end of the dead truck lever 172, the upper end of said dead truck lever having a pivotal connection as at 174 to the bracket 176 integrally formed on the transom 8. Intermediate its ends as at 178, the dead truck lever 172 is pivotally connected to the fulcrum 180, said fulcrum being secured on the offset end 182 of the brake beam 184. Support means for the beam 184 is provided in the form of the hanger 186, the upper end of which is pivotally secured as at 188 to the bracket 190 integrally formed on the transom 8 adjacent its juncture with the side frame 2. The lower end of the hanger 186 is pivotally connected as at 192 to the trunnion end 194 of the brake beam 184. Likewise, mounted on said trunnion end is the brake head 196 with its associated brake shoe 198.

In operation, actuation of the power means 114 will cause the piston 112 to move to the left (Figure 2) thus causing the cylinder lever 104 to rotate in a counter-clockwise direction about the pivot 106 at its lower end, and through the clevis means 100 causing the dead horizontal lever 90 to rotate in a clockwise direction about the fulcrum 92 intermediate its ends thus causing the pull rod 86 to move to the right and rotating the live truck lever 48 in a clockwise direction about the pivot 50 at its lower end until the brake shoe 36 carried by the brake beam 26 is brought into engagement with the periphery of the adjacent wheel. Continued movement causes the live truck lever 48 to rotate in a clockwise direction about the pivot 46 intermediate its ends, thus moving the pull rod 52 to the left (Figure 2) and causing the dead truck lever 56 to rotate in a clockwise direction about its point of support 58 until the brake shoe 76 carried on the brake beam 68 is brought into engagement with the opposite periphery of said last-mentioned wheel. Continued movement of the power means will cause the cylinder lever 104 to rotate in a clockwise direction about the pivot 102 at its upper end thus moving the pull rod 108 to the left (Figure 2) and causing the slack adjuster 122 to rotate in a clockwise direction about its point of support 123 on the slack adjuster 125. The clockwise rotation of the slack adjuster lever 122 through the clevis means 126 actuates the horizontal lever 130 which rotates in a counter-clockwise direction about the pivot 134 intermediate its ends and causes the pull rod 140 to move to the left. Movement of the pull rod 140 rotates the live truck lever 144 in a counter-clockwise direction about the pivot point 166 at its lower end until the brake shoe 158 carried on the brake beam 152 is brought into engagement with the periphery of the adjacent wheel. Continued movement causes the live truck lever 144 to rotate in a counter-clockwise direction about the pivot 146 intermediate its ends, thus moving the pull rod 168 to the right (Figure 2) and rotating the dead truck lever 172 in a counter-clockwise direction about its pivotal point of support 174 thus bringing the brake shoe 198 carried on the brake beam 184 into engagement with the opposite periphery of the last-mentioned wheel.

Release of the power means causes the various parts to move in directions reverse to those just described thus releasing the brakes and causing them to assume their normal inoperative position. It will be understood of course that in actual operation the movements of the various parts described take place substantially simultaneously and not successively, this means of description being used for purposes of simplicity.

It is to be understood that I do not wish to be limited by the exact embodiments of the device shown which are merely by way of illustration and not limitation as various and other forms of the device will of course be apparent to those skilled in the art without departing from the spirit of the invention or the scope of the claims.

1. In a railway car truck the combination of a truck frame comprising side frames and a transverse load carrying member having projecting ends, side bearings on said projecting ends outwardly of said side frame, wheel and axle assemblies, and brake rigging comprising brake beams supported on opposite sides of each wheel and axle assembly, pairs of live and dead levers supported adjacent each wheel and connected to opposite beams, connections between the live and dead levers of each pair, dead horizontal levers fulcrumed from said side frame intermediate said wheel and axle assemblies, connections between said horizontal levers and said live levers, power means and slack adjusting means mounted on each side frame on each side of said projecting ends, and operative connections between each of said power means and one of said horizontal levers and between each of said slack adjusting means and other of said horizontal levers.

2. In brake rigging for a railway car truck the combination of a truck frame comprising side frames and a transverse load carrying member having side bearings outwardly of said side frames, wheel and axle assemblies, power means and slack adjusting means mounted on each of said side frames, and a brake rigging comprising brake beams supported on opposite sides of each of said wheel and axle assemblies, spaced horizontal levers fulcrumed on each of said side frames, cylinder levers having their upper ends connected respectively to adjacent horizontal levers and connected intermediate their ends to said power means respectively, slack adjuster levers having their upper ends connected respectively to adjacent horizontal levers and connected intermediate their ends to said slack adjusting means respectively, and operative connections between the cylinder lever and slack adjuster lever associated with each side frame.

3. In a railway car truck the combination of a truck frame comprising a side frame and a load carrying member having a side bearing outwardly of said side frame, wheel and axle assemblies, power means and slack adjusting means mounted on said side frame, and brake rigging comprising brake beams on opposite sides of each of said assemblies, operative connections between the beams associated with each assembly, dead horizontal levers fulcrumed from said side frame adjacent each of said assemblies and disposed to operate respectively the beams associated with said assemblies, a cylinder lever having an end connected to one of said horizontal levers and connected intermediate its ends to said power means, a slack adjuster lever having an end connected to another of said horizontal levers and connected intermediate its ends to said slack adjuster means, and an operative connection between said cylinder lever and said slack adjuster lever.

4. In a four wheel railway car truck the combination of a truck frame comprising a side frame and a load carrying member having a side bearing outwardly of said side frame, spaced wheel and axle assemblies, power means and slack adjuster means mounted on said side frame, vertical levers associated respectively with said means and operatively connected to each other, spaced horizontal levers fulcrumed from said side frame and connected respectively to said vertical levers, brake rigging associated with each of said assemblies and comprising brake beams disposed on opposite sides thereof, dead truck levers connected to the beam on one side, live truck levers connected to the beam on the opposite side, and operative connections between the live and dead truck levers adjacent each wheel, said riggings being operatively connected respectively to said horizontal levers.

5. In a four wheel railway car truck the combination of a truck frame having spaced side frames and a load carrying member having ends projecting outwardly of said side frames, spaced wheel and axle assemblies disposed in supporting relation to said truck frame, brake rigging associated with each of said assemblies, power means and slack adjusting means mounted on each of said side frames on opposite sides of said projecting ends, a vertical lever associated with each of said means, pull rods connecting the vertical levers associated with each side frame, spaced horizontal levers fulcrumed on each of said side frames and having their outer ends operatively connected respectively to said vertical levers, and operative connections between the horizontal levers at one end of said truck and the rigging associated with the adjacent wheel and axle assembly and between the horizontal levers at the opposite end of said truck and the rigging associated with the other of said assemblies.

6. In brake rigging for a railway car truck the combination of a truck frame comprising a side frame and a transverse load carrying member having a side bearing outwardly of said side frame, spaced wheel and axle assemblies, brake rigging associated with each of said assemblies, said rigging comprising brake beams disposed on opposite sides thereof, dead truck levers connected to one of said beams, live truck levers connected to the other of said beams, operative connections between the live and dead truck levers adjacent each wheel, power means and slack adjuster means mounted on said side frame on opposite sides of said side bearing, a vertical lever associated with each of said means, a pull rod connecting the lower ends of said vertical levers, and spaced horizontal levers fulcrumed to said frame and having their outer ends connected respectively to said vertical levers and their inner ends connected respectively to said live truck levers.

7. In brake rigging for a railway car truck the combination of a truck frame comprising a side frame and a transverse load carrying member having a side bearing outwardly of said side frame, spaced wheel and axle assemblies, brake rigging associated with each of said assemblies, said rigging comprising brake beams disposed on opposite sides thereof, dead truck levers connected to one of said beams, live truck levers connected to the other of said beams, operative connections between the live and dead truck levers adjacent each wheel, power means and slack adjuster means mounted on said side frame on opposite sides of said side bearing, a vertical lever associated with each of said means, a pull rod connecting the lower ends of said vertical levers, and spaced horizontal levers fulcrumed in horizontal openings through said side frame and having their outer ends connected respectively to said vertical levers and their inner ends connected respectively to said live truck levers.

8. In brake rigging for a railway car truck the combination of a truck frame comprising a side frame and a load carrying member having a side bearing outwardly of said side frame, spaced wheel and axle assemblies, brake rigging associated with each of said assemblies and comprising brake beams supported on opposite sides thereof, dead truck levers connected to one of said beams, live truck levers connected to the other of said beams, pull rods connecting the lower ends of said live and dead truck levers adjacent each wheel, power means and slack adjuster means mounted on said side frame, vertical levers operatively connected intermediate their ends respectively to said means and at their lower ends operatively connected to each other, horizontal levers fulcrumed in openings in said side frame and connected respectively to said vertical levers, and operative connections between one of said horizontal levers and the adjacent rigging and between the other of said horizontal levers and the other of said riggings.

9. In brake rigging for a four wheel railway car truck the combination of a truck frame comprising a side frame and a transverse load carrying member, spaced wheel and axle assemblies, power means and slack adjuster means mounted on said side frame on opposite sides of said load carrying member, vertical levers connected intermediate their ends respectively to said means, a pull rod connecting the lower ends of said vertical levers, horizontal levers fulcrumed in said side frame and having their outer ends connected respectively to the upper ends of said vertical levers, brake rigging associated with each of said wheel and axle assemblies, and operative connections between the brake rigging at one end of said truck and the adjacent horizontal lever and between the brake rigging at the opposite end of said truck and the other of said horizontal levers.

10. In a four wheel railway car truck the combination of a truck frame having spaced side members and a transverse load carrying member, spaced wheel and axle assemblies, pairs of horizontal levers fulcrumed in each of said side members on opposite sides of said load carrying member, power means and slack adjuster means mounted on each of said side members adjacent said horizontal levers respectively, a vertical lever associated with each of said means, said vertical lever having its upper end connected to the adjacent horizontal lever and its lower end connected to the vertical lever associated with another of said means, brake rigging associated with each wheel and axle assembly, and operative connections between the horizontal levers associated with said power means and the brake rigging associated with one of said wheel and axle assemblies and between the horizontal levers associated with the other of said means and the brake rigging at the opposite end of said truck.

11. In a four wheel railway car truck the combination of a truck frame having spaced side members and a transverse load carrying member, spaced wheel and axle assemblies, pairs of horizontal levers fulcrumed in each of said side members on opposite sides of said load carrying member, power means and slack adjuster means mounted on each of said side members adjacent said horizontal levers respectively, a vertical lever associated with each of said means, said vertical lever having its upper end connected to the adjacent horizontal lever and its lower end connected to the vertical lever associated with another of said means, brake rigging associated with each of said wheel and axle assemblies, said rigging comprising brake beams supported at opposite sides of said assembly, dead truck levers connected to one of said beams, live truck levers connected to the other of said beams, operative connections between the live and dead truck levers adjacent each wheel, and operative connections between said live truck levers respectively and the adjacent horizontal levers.

12. In a four wheel railway car truck the combination of a truck frame comprising spaced side members and a load carrying member having ends projecting outwardly of said side members, wheel and axle assemblies, power means and slack adjuster means mounted on each of said side members, vertical levers connected intermediate their ends respectively to said means and at their lower ends to each other, and spaced horizontal levers fulcrumed in each of said side frames and having their outer ends connected respectively to said vertical levers, said horizontal levers at one end of said truck having their inner ends operatively connected to the brake rigging associated with the adjacent wheel and axle assembly and said horizontal levers at the opposite end of said truck having their inner ends operatively connected to the brake rigging associated with the wheel and axle assembly at the opposite end of said truck.

13. In brake rigging for a four wheel railway car truck the combination of a truck frame comprising a side member, spaced wheel and axle assemblies, power means and slack adjuster means mounted on said side member, a horizontal lever supported adjacent each of said means and operatively connected thereto, brake rigging associated with each of said wheel and axle assemblies, said brake rigging comprising brake beams supported on opposite sides thereof, a dead truck lever connected to one of said beams, a live truck lever connected to the other of said beams, a pull rod connecting the lower ends of said live and dead truck levers, and pull rods connecting said live truck levers respectively to the inner ends of said horizontal levers.

14. In brake rigging for a four wheel railway car truck the combination of a truck frame having a side member and a load carrying member having a projecting end, spaced wheel and axle assemblies, power means and slack adjuster means mounted on said side member on opposite sides of said projecting end, vertical levers associated respectively with said means, a pull rod connecting the lower ends of said vertical levers, spaced horizontal levers fulcrumed on said side member and having their outer ends connected respectively to said vertical levers, brake rigging associated with each of said wheel and axle assemblies, and operative connections between said riggings respectively and said horizontal levers.

15. In brake rigging for a railway car truck the combination of a truck frame comprising spaced side frames and a load carrying member having ends projecting outwardly of said side frames, wheel and axle assemblies, power means mounted on each of said side frames on one side of said load carrying member, slack adjusting means mounted on each of said side frames on the opposite side of said load carrying member, a vertical lever associated with each of said means, operative connections between the vertical levers associated with each side frame, and spaced horizontal levers fulcrumed from each side frame and having their outer ends connected respectively to said vertical levers and their inner ends operatively connected respectively to brake riggings associated with wheel and axle assemblies at the opposite ends of the truck.

16. In brake rigging for a four wheel railway car truck the combination of a truck frame comprising a side frame and a load carrying member having a side bearing outwardly of said side frame, spaced wheel and axle assemblies, brake rigging associated with each of said assemblies, spaced horizontal openings in said side frame, horizontal levers fulcrumed respectively in said openings and having their inner ends connected respectively to said riggings, power means and slack adjuster means mounted on said side frame adjacent said horizontal levers respectively, vertical levers connected respectively intermediate their ends to said means and at their upper ends respectively to said horizontal levers, and a pull rod connecting the lower ends of said vertical levers.

17. In a railway car truck the combination of a truck frame comprising a side frame and a transverse load carrying member having an end projecting outwardly of said side frame, spaced wheel and axle assemblies, power means mounted on said side frame adjacent one end of said truck, slack adjuster means mounted on said side frame adjacent the other end of said truck, operative connections between said means, spaced horizontal levers projecting through said side frame and fulcrumed therein, said horizontal levers being operatively connected respectively to said means, brake rigging associated with each of said wheel and axle assemblies, and operative connections between said brake riggings respectively and said horizontal levers.

18. In brake rigging for a railway car truck the combination of a truck frame comprising a side member, spaced wheel and axle assemblies, power means and slack adjuster means mounted on said side member on opposite sides of the transverse center line of said truck, an operative connection between said means, horizontal levers fulcrumed in said side member and operatively connected respectively to said means, brake rigging associated with each of said wheel and axle assemblies, and operative connections between said riggings respectively and said horizontal levers.

19. In brake rigging for a four wheel railway car truck the combination of a truck frame comprising a side member, spaced wheel and axle assemblies, power means and slack adjuster means mounted on said side member adjacent the opposite ends thereof, a vertical lever associated with each of said means, a pull rod connecting the lower ends of said vertical levers, horizontal levers having their outer ends connected respectively to said vertical levers and fulcrumed intermediate their ends respectively from said side member, brake rigging associated with each of said wheel and axle assemblies, and operative connections respectively between said riggings and said horizontal levers.

20. In a railway truck a frame, spaced wheel and axle assemblies, a brake cylinder and a slack adjuster on one side of said frame, clasp brake means associated with each of said assemblies and including live and dead truck levers on opposite sides of each assembly adjacent each wheel thereof, a pair of horizontal dead levers fulcrumed on said side of said frame and having their inner ends connected respectively to the adjacent live truck levers, a cylinder lever having its upper end connected to one of said horizontal dead levers and a point intermediate its ends connected to said brake cylinder, a slack adjuster lever having its upper end connected to another of said dead horizontal levers and a point intermediate its ends fulcrumed on said slack adjuster, and a connection between the lower ends of said cylinder lever and said slack adjuster lever.

21. In a railway truck a frame, wheel and axle assemblies, clasp brake means associated with each of said assemblies, brake cylinders and slack adjusters supported on opposite sides of said frame at corresponding points thereof, operative connections between the brake cylinders at opposite sides of the truck and one of said braking means including horizontal dead levers and vertical live levers and between the slack adjusters at opposite sides of the truck and the other of said braking means and including a plurality of horizontal dead levers and vertical dead levers, and connections between the vertical levers at opposite sides of the truck.

22. In a railway truck a framework, power means and a slack adjuster mounted on each side of said framework, spaced wheel and axle assemblies, braking means associated with each of said assemblies, operative connections between said power means and one of said assemblies including vertical cylinder levers on opposite sides of the truck and operative connections between the other of said braking means and said slack adjusters including vertical slack adjuster levers at opposite sides of the truck, and pull rods connecting the slack adjuster lever and the cylinder lever at each side of said truck.

23. In a railway truck a frame having a side member, a brake cylinder and a slack adjuster mounted on said side member, spaced wheel and axle assemblies, brake means associated with each of said assemblies, operative connections between one of said brake means and the brake cylinder and between the other of said brake means and said slack adjuster, each of said connections comprising a horizontal lever and a vertical lever, and a connection between the vertical levers associated respectively with the brake cylinder and the slack adjuster.

24. In a railway truck a frame having a side member, a brake cylinder and a slack adjuster mounted thereon, spaced wheel and axle assemblies, brake means associated with each of said assemblies, a live cylinder lever and a dead slack adjuster lever having their lower ends connected to each other and points intermediate their ends connected respectively to said cylinder and to said slack adjuster, and operative connections between the upper ends of said cylinder and slack adjuster levers respectively and the brake means associated with said wheel and axle assemblies.

25. In a railway truck a frame having a side member, a brake cylinder and a slack adjuster mounted thereon, spaced wheel and axle assemblies, brake means associated with each of said assemblies, a live cylinder lever and a dead slack adjuster lever having their lower ends connected to each other and points intermediate their ends connected respectively to said cylinder and to said slack adjuster, and operative connections between the upper ends of said cylinder and slack adjuster levers respectively and the brake means associated with said wheel and axle assemblies, each of said connections comprising a dead lever fulcrumed on said side member.

26. In a railway truck a frame having a side member, a brake cylinder and a slack adjuster mounted thereon, spaced wheel and axle assemblies, brake means associated with each of said assemblies, a live cylinder lever and a dead slack adjuster lever having their lower ends connected to each other and points intermediate their ends connected respectively to said cylinder and to said slack adjuster, and operative connections between the upper ends of said cylinder and slack adjuster levers respectively and the brake means associated with said wheel and axle assemblies, each of said connections comprising a dead lever extending through said side member and fulcrumed therein.

27. In a railway truck a frame, a transverse load carrying member, brake cylinders mounted on said frame at one side of said load carrying member, slack adjusters mounted on said frame at the opposite side of said load carrying member, an operative connection between the brake cylinder and the slack adjuster at each side of said frame, spaced wheel and axle assemblies, braking means associated with each of said assemblies and including live and dead levers supported on opposite sides of each of said assemblies adjacent each wheel thereof, and operative connections between said brake cylinders and one of said braking means and between said slack adjusters and the other of said braking means, each of said connections comprising a dead horizontal lever fulcrumed on said frame.

28. In a railway truck a frame, a transverse load carrying member, brake cylinders mounted on said frame at one side of said load carrying member, slack adjusters mounted on said frame at the opposite side of said load carrying member, an operative connection between the brake cylinder and the slack adjuster at each side of said frame, spaced wheel and axle assemblies, braking means associated with each of said assemblies and including live and dead levers supported on opposite sides of each of said assemblies adjacent each wheel thereof, and operative connections between said brake cylinders and one of said braking means and between said slack adjusters and the other of said braking means, each of said connections comprising a dead lever projecting through a portion of said frame and fulcrumed therein.

29. In a railway truck a frame, a transverse load carrying member, brake cylinders mounted on said frame at one side of said load carrying member, slack adjusters mounted on said frame at the opposite side of said load carrying member, an operative connection between the brake cylinder and the slack adjuster at each side of said frame, spaced wheel and axle assemblies, braking means associated with each of said assemblies and including live and dead levers supported on opposite sides of each of said assemblies adjacent each wheel thereof, and operative connections between said brake cylinders and one of said braking means and between said slack adjusters and the other of said braking means, each of said connections comprising a dead lever fulcrumed in said frame and a vertical lever outwardly thereof.

30. In a railway truck a frame, a brake cylinder and a slack adjuster mounted at corresponding points on opposite sides of said frame, operative connections between the brake cylinder and the slack adjuster at each side of the truck, a wheel and axle assembly adjacent each end of the truck, clasp brake means associated with each of said assemblies and including live and dead levers on opposite sides thereof adjacent each wheel, and horizontal dead levers fulcrumed on each side of said framework and having their inner ends connected to said live truck levers and their outer ends connected to vertical levers, the vertical levers at each side of said truck having their lower ends connected to each other and points intermediate their ends connected to the adjacent cylinder and slack adjuster respectively.

31. In a railway truck a framework including a side member, a transverse load carrying member, a brake cylinder and a slack adjuster on said side member on opposite sides of said load carrying member, spaced wheel and axle assemblies, clasp brake means associated with each of said assemblies, operative connections between one of said brake means and said brake cylinder and between the other of said brake means and said slack adjuster, and an operative connection between said slack adjuster and said brake cylinder.

32. A railway truck having a framework including a side member, power means and slack adjuster means mounted on said side member, spaced wheel and axle assemblies, braking means associated with each of said assemblies and including dead levers supported at one side thereof and live truck levers supported at the other side thereof, straps connecting the live and dead levers adjacent each wheel, and horizontal levers fulcrumed on said side member and having their inner ends connected to said live truck levers respectively and their outer ends connected respectively to vertical live and dead levers, said vertical levers having their lower ends connected to each other and points intermediate their ends connected respectively to said power means and to said slack adjuster means.

33. A railway truck having a framework with a side member, a brake cylinder and a slack adjuster mounted on said side member, spaced wheel and axle assemblies, clasp brake means associated with each of said assemblies, vertical live and dead levers having their lower ends connected to each other and points intermediate their ends connected respectively to said brake cylinder and to said slack adjuster, and horizontal levers fulcrumed on said side member and having their inner ends connected respectively to said braking means and their outer ends connected respectively to said vertical live and dead levers.

34. In a railway truck a framework having a side member, a brake cylinder and a slack adjuster mounted on said side member, spaced wheel and axle assemblies, braking means associated with each of said assemblies, vertical live and dead levers connected to each other and connected respectively to said brake cylinder and to said slack adjuster, and operative connections between said vertical levers and said braking means respectively.

35. In a railway truck a framework having a side member, a brake cylinder and a slack adjuster mounted on said side member, spaced wheel and axle assemblies, braking means associated with each of said assemblies, vertical live and dead levers connected to each other and connected respectively to said brake cylinder and to said slack adjuster, and operative connections between said vertical levers and said braking means respectively, each of said connections comprising a dead lever fulcrumed on said side member.

36. In a railway truck a framework having a side member, a brake cylinder and a slack adjuster mounted on said side member, spaced wheel and axle assemblies, braking means associated with each of said assemblies, vertical live and dead levers connected to each other and connected respectively to said brake cylinder and to said slack adjuster, and operative connections between said vertical levers and said braking means respectively, each of said connections comprising a dead lever projecting through said side member and fulcrumed therein.

WALTER H. BASELT.